UNITED STATES PATENT OFFICE.

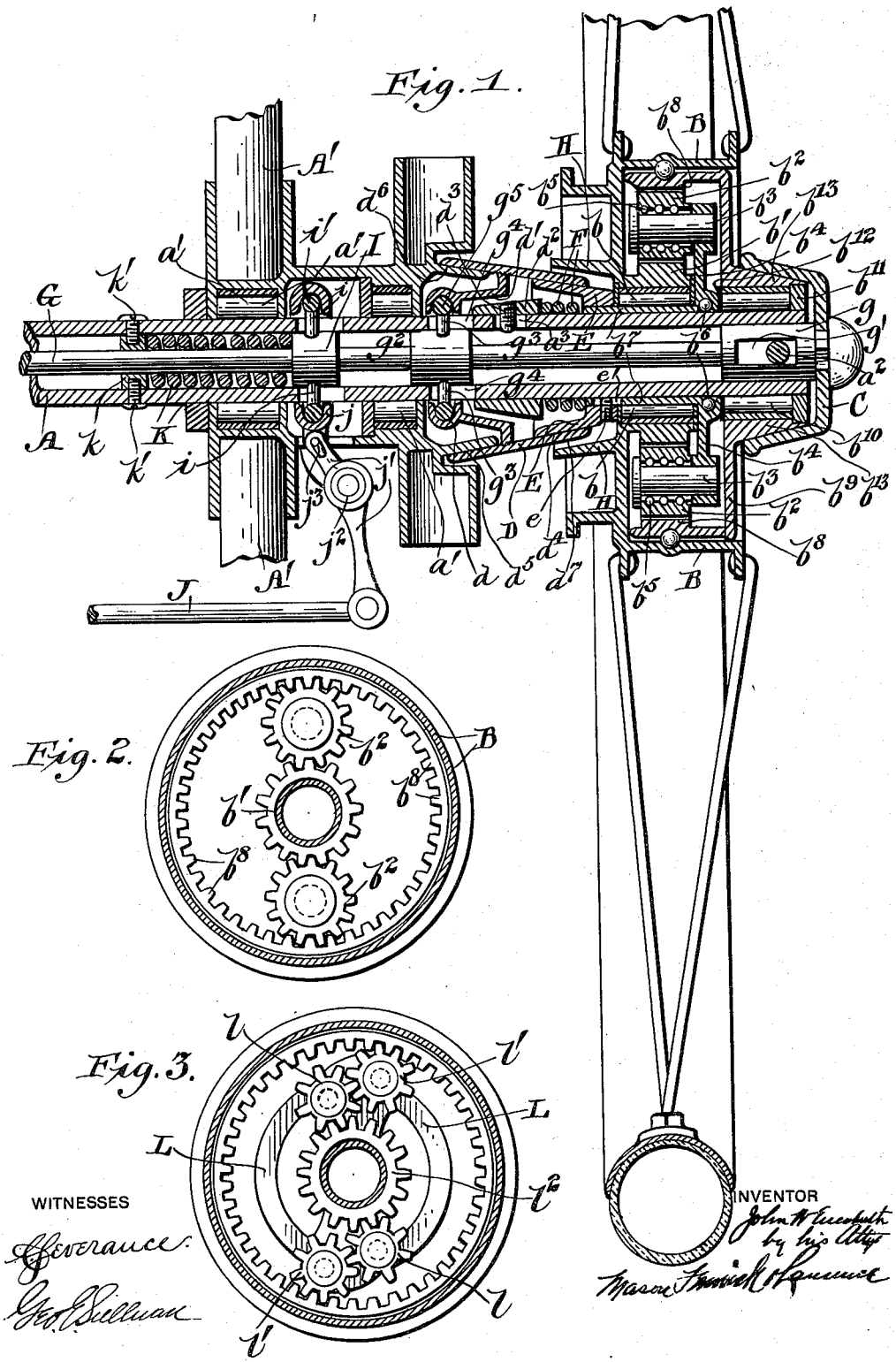

JOHN W. EISENHUTH, OF NEW YORK, N. Y., ASSIGNOR TO ELLA V. EISENHUTH, OF SAME PLACE.

CHANGEABLE-SPEED GEARING.

SPECIFICATION forming part of Letters Patent No. 617,647, dated January 10, 1899.

Application filed December 31, 1897. Serial No. 665,151. (No model.)

*To all whom it may concern:*

Be it known that I, JOHN W. EISENHUTH, a citizen of the United States, residing at New York, in the county of New York and State of New York, have invented certain new and useful Improvements in Changeable-Speed Gearing; and I do hereby declare the following to be a full, clear, and exact description of the invention, such as will enable others skilled in the art to which it appertains to make and use the same.

My invention relates to improvements in changeable-speed gearings, and especially to such kind of gearing as is applicable to motor-vehicles, bicycles, pulleys, or like mechanisms.

It consists in a novel construction in which is interposed between a shaft and the hub of a wheel a gearing for actuating the same and friction-cups which are adapted to engage frictional surfaces, whereby the gearing may be thrown into operation or out of operation and whereby the shaft and the hub may be caused to rotate at the same speed.

It consists in certain other novel constructions, combinations, and arrangements of parts, as will be hereinafter fully described and claimed.

In the accompanying drawings, Figure 1 represents a vertical central section through the shaft and the hub of a wheel, illustrating my improved changeable-speed mechanism. Fig. 2 represents a detail sectional view showing the gearing mounted in the hub of the wheel; and Fig. 3 represents a similar view, but showing a little different arrangement of the gears.

A in the drawings represents a shaft, and B the hub of a wheel or pulley. C represents a friction-cup, and D a double friction-cup.

While I intend to use my improved changeable-speed mechanism wherever it would be advantageously applied to a motor-vehicle, bicycle, or a pulley or other similar mechanism, yet for the sake of illustration I have shown my invention in the drawings applied to the shaft of a motor-vehicle. The shaft A is preferably mounted in suitable bearings, as $a$, formed upon the frame A' of the vehicle and supplied with suitable rollers, as $a'$, forming antifriction-bearings. Near the outer end of the shaft A the hub B is mounted, antifriction-roller bearings, as $b$, being provided for the same to run on. Formed upon the said hub B is a pinion $b'$, which is adapted to engage pinions $b^2$ $b^2$, as illustrated in the drawings. The pinions $b^2$ $b^2$ are mounted upon studs $b^3$ $b^3$, carried by a stud-plate $b^4$. Ball-bearings, as at $b^5$, are preferably interposed between said studs and pinions, whereby the friction between the same is greatly lessened. The stud-plate $b^4$ is adapted to run freely upon the shaft A and has ball-bearings, as $b^6$, interposed between itself and the said shaft A. A sleeve portion, as $b^7$, is also formed upon or secured to the stud-plate $b^4$ and extends between the roller-bearings $b$ and the shaft A. This sleeve portion $b^7$ is preferably made of sufficient length to extend outside the hub B and carries at the said outer end an annular frictional collar, as E. The collar E is provided with a slot, as $e$, which is adapted to engage a pin, as $e'$, the said pin being secured in the sleeve $b^7$. By this means the collar E is made secure upon the sleeve $b^7$, so as not to revolve independently thereof, and yet is capable of longitudinal movement on the said sleeve by reason of slot E.

The pinions $b^2$ $b^2$, mounted upon the stud-plate $b^4$, also engage an internal gear, as $b^8$, the said gear being formed upon the flange of a plate $b^9$. The plate $b^9$, carrying the gear $b^8$, is mounted upon the outer end of the shaft A upon roller bearings $b^{10}$. The said roller-bearings are confined between an annular collar $b^{11}$ and the stud-plate $b^4$, a thin washer, as $b^{12}$, being interposed between the said roller-bearings and the said stud-plate. A shaft or rod, as G, is mounted centrally of the shaft A and has an enlargement $g$ formed upon it at its outer end. The said enlargement carries the cup C, which is rigidly secured thereto, so as to turn therewith. The said cup C is adapted to fit upon the hub portion $b^{13}$ of the plate $b^9$, so that when the said cup is brought snugly against the said hub the gear $b^8$ will be forced to turn with the axle or shaft A. In order to cause the shaft G to turn with the shaft A, a pin, as $a^2$, secured at its ends in the shaft A, passes through and engages a slot, as $g'$, formed in the enlargement $g$. This slot permits of the lateral movement of the rod G in moving the cup C back and forth. It will be apparent that when the cup C is in engagement with the hub $b^{13}$ the shaft will communicate motion to the hub B and the wheel thereon through the gearing $b^8$, pinions $b^2$, and pinion $b'$, thus causing a reverse motion of the said wheel. The shaft G is also provided with an enlargement, as at $g^2$, the said enlargement carrying arms or pins $g^3$, which extend through slots, as $g^4$, formed in the shaft A, and engage a ring or annulus $g^5$, which engages a groove, as $d$, formed upon the friction-cup D. The friction-cup D is so formed as to have three annular frictional engaging surfaces. The inmost frictional engaging surface of this cup is at $d'$ and is adapted to engage a corresponding frictional ring or annulus, as $d^2$, which is mounted upon the shaft A. In order to allow this annulus $d^2$ to have a longitudinal movement and yet to cause it to revolve with the shaft A, it is provided with a pin, as $d^3$, which engages a slot, as $a^3$, formed in the shaft A. A coil-spring, as F, is interposed between the annulus $d^2$ and the cup E for normally keeping them apart. This spring is made of sufficient strength to keep the friction-surfaces engaged under a load and enables the parts to adapt themselves to various positions readily and quickly. The outer portion of the cup D is provided with two inner frictional faces, as $d^4$ $d^5$, the frictional surface $d^4$ being adapted to engage the frictional collar E. When the surface $d^4$ engages the collar E, the surface $d^5$ will also be brought into engagement with the frictional surface $d^6$, formed upon a portion of the frame A'. When the parts are thus in engagement, the frictional surface $d^6$ being a fixed unit, the collar E will be held stationary, and consequently the stud-plate $b^4$. This is an essential feature when the intermediate gearing above described is to be used in actuating the wheel. The cup D is also provided with an outer frictional surface, as at $d^7$, which is adapted to engage an annular projection or flange, as H, formed upon the hub B. When it is desired to cause the hub B and the wheel carried thereby to revolve at the same speed that the shaft A revolves, the cup D is forced outwardly by means of the rod G, so as to bring the frictional surface $d^7$ into engagement with the flange H, the frictional surface $d'$ being at the same time brought into engagement with the annulus $d^2$, which revolves with the shaft A. When it is desired to decrease the speed, the collar E is moved in the other direction by means of the shaft G, so that the flange H runs free and the frictional surfaces $d^4$ and $d^5$ are brought into engagement, respectively, with the collar E and the frictional surface $d^6$, whereby the said stud-plate is held stationary. In order to move the shaft G longitudinally and accomplish the above-mentioned changes, the shaft G is provided with another enlargement, as I, the said enlargement being provided with arms or pins $i$ $i$, which are secured to a ring or annulus $i'$. A grooved collar, as $j$, incloses this annulus or ring $i'$ and engages by a pin-and-slot connection $j^3$ a lever, as $j'$, pivoted upon the frame A', as at $g^3$. The lever $j'$ is connected at its outer end to an operating-rod J, which may be lead off to any part of the vehicle within suitable reach of the operator. It will be apparent that by means of the rod J and lever $j'$ the shaft G may be moved longitudinally within the shaft A at will. In order to facilitate the operation of this rod J, a coil-spring, as K, is interposed between the enlargement I and a collar $k'$, which is secured by means of screws $k^2$ interiorly of the shaft A. In order to support the hub B more firmly in place, ball-bearings, as B', are interposed between the said hub and the internal gear $b^8$.

It is often a very desirable arrangement in motor-vehicles, as when it is desired to back the vehicle, to do so at a little lower rate of speed than that which is used in going forward. In the event of its being desired to decrease the speed of the vehicle and yet not reverse its movement I contemplate arranging the intermediate gearing in a slightly-different manner to produce this result. As illustrated in Fig. 3 of the drawings, the internal gearing meshes with the pinions, as $l$, mounted upon a stud-plate, as L. The said stud-plate also carries pinions $l'$, adapted to mesh with the pinions $l$ and communicate motion therefrom to the pinion $l^2$, which is secured to the hub of the wheel. It will readily be seen that by this construction the speed of the vehicle may be changed without reversing its movement.

It will be apparent from the above description that I am enabled to produce a changeable-speed mechanism which is compact and simple and yet very effective and quick in its operation.

Having now described my invention, what I claim as new, and desire to secure by Letters Patent, is—

1. In a changeable-speed gearing, the combination with a shaft, of a hub mounted so as to revolve freely upon said shaft and having gear-teeth and a frictional surface formed upon it, an internal gear and an intermediate gearing also loosely mounted upon the said shaft and provided with frictional surfaces, and frictional means mounted upon the said shaft adapted to engage the said internal gear and the said intermediate gearing or the said hub for varying the speed of the same, substantially as described.

2. In a changeable-speed mechanism, the combination with a shaft, of a hub having gear-teeth mounted so as to revolve freely thereon, an internal gear also mounted so as to run freely upon the said shaft, the said internal gear extending into the said hub, balls interposed between said hub and the said internal gear, so as to assist in supporting the said hub upon the shaft, intermediate gearing interposed between the internal gear and the hub, frictional means mounted upon the shaft and provided with frictional surfaces which are adapted when the said means is moved in one direction to engage the intermediate gearing and the internal gear for imparting one speed to the hub and when moved in the opposite direction to engage the hub directly for imparting the same speed to the hub which the shaft has, substantially as described.

3. In a changeable-speed mechanism, the combination with a shaft, of a hub adapted to run freely thereon and having gear-teeth and a frictional surface, an internal gear also freely mounted upon the shaft and having a frictional surface, a stud-plate loosely mounted upon the said shaft and having a frictional surface, intermediate gearing interposed between the internal gear and the hub and carried by said stud-plate, and frictional cups mounted upon the shaft and adapted when moved in one direction to engage the frictional surfaces of the stud-plate and the frictional surfaces of the internal gear for imparting movement to the hub through the intermediate gearing and when moved in the opposite direction to engage the frictional surface upon the hub for communicating the speed of the shaft directly to the said hub, substantially as described.

4. In a changeable-speed mechanism for vehicles, the combination with a shaft, of a hub mounted thereon having gear-teeth, an internal gear and a stud-plate also mounted upon the said shaft, frictional surfaces formed upon the said internal gear and stud-plate, a double frictional cup having interior and exterior frictional surfaces adapted when moved in one direction to bridge and connect the stud-plate with a fixed portion of the frame of a vehicle and when moved in the opposite direction to connect the hub of the wheel directly with the shaft and release the stud-plate, substantially as described.

5. In a changeable-speed gearing for vehicles, the combination with a shaft, of a hub mounted thereon, an internal gear and a stud-plate also mounted upon the said shaft, the said hub-gear and stud-plate having frictional surfaces formed upon them, frictional cups mounted upon the shaft, one of said cups being adapted to engage the frictional surface upon the internal gear and the other cup being adapted to engage the frictional surfaces upon the stud-plate and hub alternately, the said latter cup being also adapted to engage frictional surfaces upon the shaft and upon the frame of a vehicle so as to turn with the shaft or be held stationary, whereby by moving the cups back and forth the speed of the hub may be changed, substantially as described.

6. In a changeable-speed gearing, for vehicles, the combination with a shaft, of a hub having gear-teeth mounted thereon so as to revolve freely, an internal gear also mounted upon the said shaft and adapted to run freely thereon, the said internal gear extending interiorly of the hub, and ball-bearings interposed between the hub and the internal gear for assisting in the support of the said hub upon the shaft, and a stud-plate loosely mounted upon the shaft and carrying intermediate gearing interposed between the internal gear and the hub, and frictional means mounted upon the said shaft for changing the speed of the hub, substantially as described.

7. In a changeable-speed mechanism, the combination with a suitable shaft, of a hub mounted thereon, intermediate gearing interposed between the said hub and the shaft, a stud-plate carrying a portion of the said intermediate gearing, a movable collar secured to the said stud-plate, a movable collar secured to the said shaft, a spring interposed between the said movable collars for forcing them apart, a cup for engaging the said collars alternately, the said cup being also adapted to engage a frictional surface on the hub and a frictional surface on the frame of the vehicle, the construction being such that upon moving the said cup longitudinally, the speed of the vehicle may be changed, substantially as described.

In testimony whereof I affix my signature in presence of two witnesses.

JOHN W. EISENHUTH.

Witnesses:
JOHN A. HILTON,
J. J. PHILLIPS.